(12) United States Patent
Danel

(10) Patent No.: US 6,927,171 B2
(45) Date of Patent: Aug. 9, 2005

(54) PIEZORESISTIVE DEVICE AND MANUFACTURING PROCESSES OF THIS DEVICE

(75) Inventor: Jean-Sébastien Danel, Echirolles (FR)

(73) Assignee: Commissariat a l'Energie Atomique, Paris (FR)

( * ) Notice: Subject to any disclaimer, the term of this patent is extended or adjusted under 35 U.S.C. 154(b) by 344 days.

(21) Appl. No.: 10/184,941

(22) Filed: Jul. 1, 2002

(65) Prior Publication Data

US 2003/0008514 A1 Jan. 9, 2003

(30) Foreign Application Priority Data

Jul. 3, 2001 (FR) .............................. 01 08812

(51) Int. Cl.$^7$ .................. H01L 21/302; H01L 21/3065
(52) U.S. Cl. .................. 438/704; 438/694; 438/706; 438/719; 438/723; 438/745; 438/756
(58) Field of Search .................. 438/694, 706, 438/719, 745, 723, 756

(56) References Cited

U.S. PATENT DOCUMENTS

| | | | |
|---|---|---|---|
| 5,172,205 A | 12/1992 | French et al. | |
| 5,719,069 A | * 2/1998 | Sparks | 438/50 |
| 5,877,425 A | 3/1999 | Suzuki et al. | |
| 5,973,590 A | 10/1999 | Kurtz et al. | |
| 6,001,666 A | * 12/1999 | Diem et al. | 438/52 |
| 6,270,685 B1 | * 8/2001 | Ishio et al. | 216/2 |
| 6,294,429 B1 | * 9/2001 | Lam et al. | 438/260 |
| 6,410,859 B1 | * 6/2002 | King | 174/260 |

FOREIGN PATENT DOCUMENTS

| | | |
|---|---|---|
| GB | 2 207 804 | 2/1989 |
| GB | 2 348 958 | 10/2000 |
| WO | WO 87/04300 | 7/1987 |

\* cited by examiner

Primary Examiner—Nadine G. Norton
Assistant Examiner—Lynette T. Umez-Eronini
(74) Attorney, Agent, or Firm—Oblon, Spivak, McClelland, Maier & Neustadt, P.C.

(57) ABSTRACT

This device, which is used to measure pressures or accelerations for example, comprises an isolation layer (32) that holds at least one piezoresistive gauge (29). The side tangents (T) of this gauge essentially make up over 90° angles with the surface (37) of the isolation layer. The device may be created using processes of wet isotropic etching, chemical anisotropic etching or isolation material growth processes.

16 Claims, 3 Drawing Sheets

US 6,927,171 B2

PIEZORESISTIVE DEVICE AND MANUFACTURING PROCESSES OF THIS DEVICE

TECHNICAL FIELD

The present invention relates to a piezoresistive device, where this device comprises at least one piezoresistive gauge, and to manufacturing processes of this device.

The specific use of the device is to measure pressures or accelerations.

DESCRIPTION OF PREVIOUS TECHNIQUE

It is reminded that the piezoresistive gauges are used as measuring devices for a large number of mechanical sensors, such as pressure sensors or acceleration sensors. It actually concerns electrical resistors whose value is altered by external constraints.

Concerning gauges of this type, we refer by way of example to the following document:

U.S. Pat. No. 5,973,590, "Ultrathin surface mount wafer sensor structures and method of fabricating same".

In order to create piezoresistive gauges, a caisson with a doping type different from that of the silicon substrate within which it is contained must first be formed, and piezoresistive gauges are then specified within this caisson through an implantation of the same type as that of the substrate.

By way of example, FIG. 1 shows a substrate 2 of P type monocrystalline silicon, a caisson 4 of N++ type within this substrate and two piezoresistive gauges 6 and 8 of P+ type monocrystalline silicon that are formed within this caisson. The gauges are therefore isolated from one another by a P-N junction.

The gauges system in FIG. 1 has one drawback, namely a leakage current that flows between the piezoresistive gauges 6 and 8. This current increases exponentially with temperature in such a way that the operating temperature of this system may not exceed a value of approximately 125° C.

It is also known that piezoresistive gauges are formed on a layer of $SiO_2$, itself formed on a substrate by depositing a polysilicon layer on this layer of $SiO_2$ and then etching this polysilicon layer right through to the layer of $SiO_2$ to form the gauges.

The piezoresistive effect is then far less noticeable had a monocrystalline silicon layer been used. Further, the polysilicon has fewer good intrinsic properties than the monocrystalline silicon since it specifically displays residual constraints and inferior mechanical characteristics.

Further, we know of piezoresistive gauges that are formed on a SOI substrate.

This known technique is illustrated in a diagram in FIG. 2 where piezoresistive gauges 10 and 12 have been etched into a layer 14 of monocrystalline silicon of a SOI substrate 16 comprising a primary substrate 18, a layer 20 of $SiO_2$ formed on the latter and layer 14 formed on this layer 20.

We thus have advantage of all monocrystalline material properties and there is a maximum piezoresistive effect.

We also know of piezoresistive gauges of the type illustrated in FIG. 2 that are applied to a surface layer of $SiO_2$ of a base substrate. Concerning the latter, we shall refer to the following document:

U.S. Pat. No. 5,877,425, "Semiconductor-type pressure sensor with sensing based upon pressure to a silicon plate".

Further, we know of piezoresistive gauges of the type illustrated in FIG. 2 that may be coated with an electric isolation layer, known as passivation layer. Within the latter, contact aperture points that open into the gauges are formed and conductors are deposited through the contact aperture points upon this passivation layer.

Nevertheless, the passivation layer deposit rarely conforms to perfect standards and voids are often found along the sides of the gauges. These voids are capable of harming the resistance of the gauges to wear and tear.

The piezoresistive gauges of the type illustrated in FIG. 2 are formed by using a classic dry etching process. This however presents a drawback.

The sides of the gauges that are obtained this way are actually abrupt since the sides form close to 90° angles with the layer upon which the gauges are formed, thereby leading to a poor coating risk of these gauges by the subsequently formed passivation layer.

This is illustrated in a diagram in FIG. 3 where we note a piezoresistive gauge 22, formed on a layer 24 of $SiO_2$, and the passivation layer 26 that does not coat gauge 22 properly. This passivation layer is actually uneven at certain points.

Another drawback is the presence of etching residues 28 on the sides of the gauges, such as gauge 22, that are likely to prevent a good adherence of the passivation layer on the sides of the gauge.

SUMMARY OF THE INVENTION

The aim of the present invention is to propose a piezoresistive device, this device comprising at least one piezoresistive gauge, where this gauge has a better mechanical resistance than the known aforementioned gauges.

The other aim of the present invention is to propose manufacturing processes of this device that do not display the aforementioned drawbacks.

Precisely, the present invention relates to a piezoresistive device, where this device comprises at least one piezoresistive gauge and an electric isolation layer upon which the piezoresistive gauge is formed, where this device is characterised in that the side tangents of this piezoresistive gauge, when observing a cross-section of the device, essentially form over 90° angles with the surface of the electric isolation layer upon which the piezoresistive gauge is formed.

The material of this gauge may be chosen amongst monocrystalline silicon, polycrystalline silicon and silicon carbide.

The present invention also relates to a manufacturing process for a piezoresistive device, where this device comprises at least one piezoresistive gauge and an electric isolation layer upon which a piezoresistive gauge is formed, where this process is characterised in that a layer of material for piezoresistive gauge is formed on the electric isolation layer, in that a protection mask is formed on the layer of material for piezoresistive gauge, in that an etching of the material or a transformation of the latter into an electric isolation material is made in the areas that are not protected by the mask, such that after having selectively removed the mask, the side tangents of the thus formed piezoresistive gauge, when observing a cross-section of the device, essentially form over 90° angles with the surface of the electric isolation layer upon which the piezoresistive gauge is formed.

According to a first particular application mode of the process that is the aim of the invention, the device is manufactured as follows:

a layer of a material for piezoresistive gauge is formed on the electric isolation layer, an etching mask is formed on this layer of material, where this mask is intended to prevent etching of the material it coats, a wet isotropic etching is made on the areas of the material that are not protected by the mask, and said mask is selectively removed.

According to a second particular application mode, the device is manufactured as follows:

a layer of material for piezoresistive gauge is formed on the electric isolation layer, an etching mask is formed on this layer of material, where this mask is intended to prevent etching of the material it coats, a plasma isotropic etching is done on the areas of the material that are not protected by the mask, and said mask is selectively removed.

According to a third particular application mode, the device is manufactured as follows:

a layer of material for piezoresistive gauge is formed on the electric isolation layer, an etching mask is formed on this layer of material, where this mask is intended to prevent the etching of the material it coats, a chemical anisotropic etching is performed on the areas of material that are not protected by the mask, and the mask is selectively removed.

According to a fourth particular application mode, the device is manufactured as follows:

a layer of material for piezoresistive gauge is formed on the electric isolation layer, where this material is capable of being transformed into an electric isolation material, a mask is formed on this layer of material, where this mask is intended to prevent the transformation of material it coats into a second electric isolation material, the material for piezoresistive gauge is transformed within the areas of the latter material that are not protected by the mask into this second electric isolation material, and this mask is selectively removed.

The second electric isolation material may be the same as that of the electric isolation layer.

The mask used in these processes may be made of silicon nitride.

Further, an electric isolation layer of passivation may be formed on the piezoresistive gauge.

The electric isolation layer of passivation may be obtained by transformation of the material of the piezoresistive gauge.

A contact opening through the passivation layer may be also be formed on the piezoresistive gauge, an electric conduction layer may be formed on the passivation layer and in the contact opening, and this electric conduction layer may be etched to define the latter.

According to a particular production mode of the invention:

a further electric isolation layer is formed on the electric conduction layer to protect the latter, and an opening through this electric isolation layer is formed with the aim of forming a contact with the electric conduction layer.

BRIEF DESCRIPTION OF DRAWINGS

The present invention shall be better understood when reading the description of production examples provided hereinafter for information and by way of example only and by referring to the attached drawings of which.

DETAILED SUMMARY OF PARTICULAR EMBODIMENTS

Figure 1:
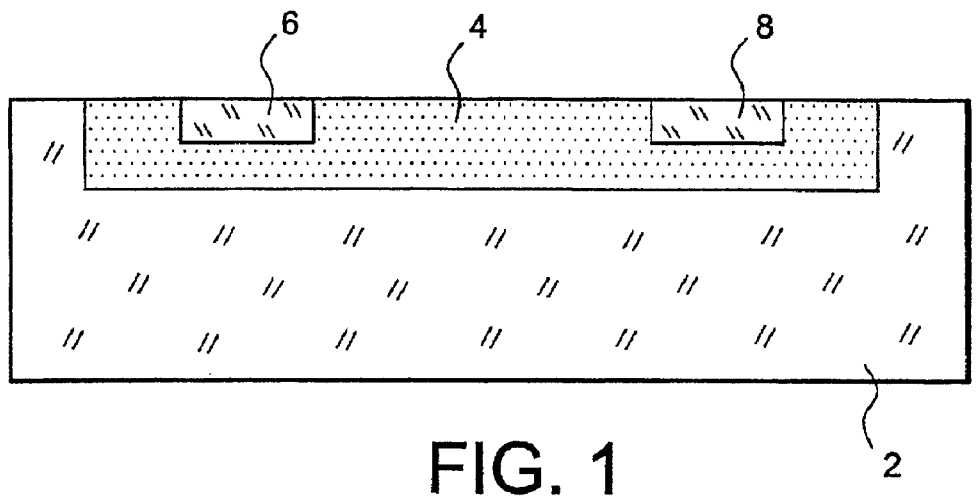
FIGS. 1 to 3 are cross-section diagrams of known piezoresistive gauges that have previously been described.
Figure 2:
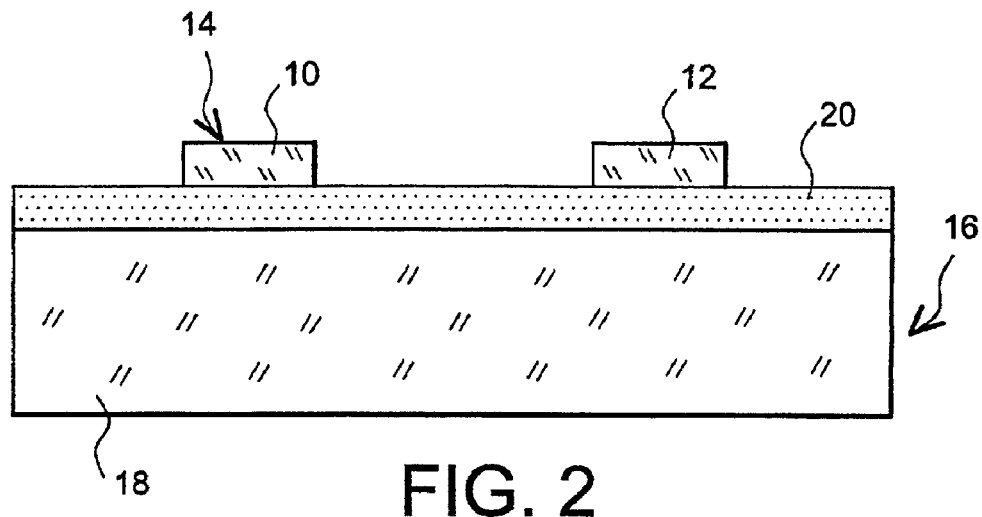
Figure 3:
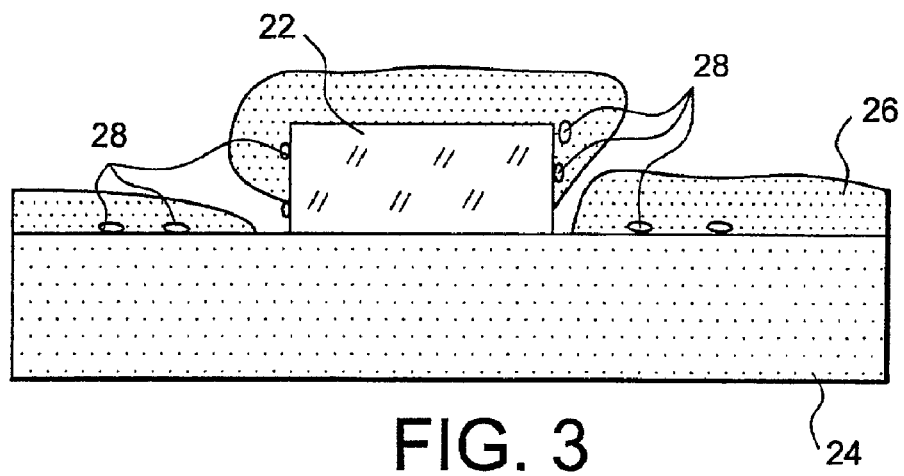
Figure 4:
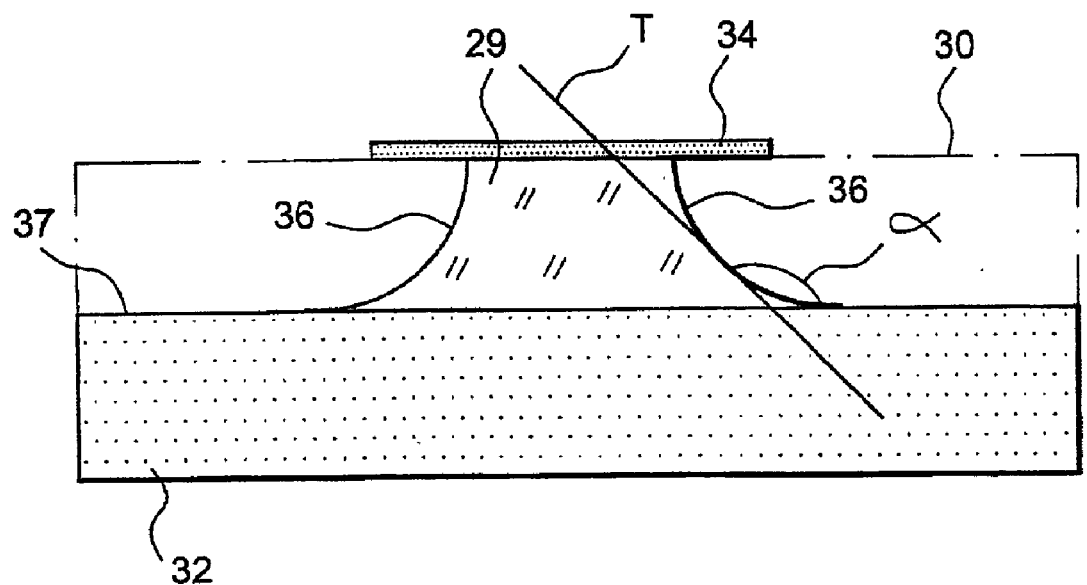
FIGS. 4 to 6 are cross-section diagrams of piezoresistive devices in accordance with the invention at manufacturing stage using a wet isotropic etching process (FIG. 4), a chemical anisotropic etching process (FIG. 5), and an isolation growth process (FIG. 6) in accordance with the invention.

FIG. 4 is a cross-section diagram of a piezoresistive device in accordance with the invention at manufacturing stage using a wet isotropic etching process.

This device consists of a piezoresistive gauge 29. It is manufactured using a structure that includes a monocrystalline silicon layer 30 which is formed on a silica layer 32, itself formed on a silicon substrate (not shown).

An etching mask 34, e.g. in silicon nitride, is initially deposited and structured on the silicon layer 30. An isotropic etching is then carried out on this silicon layer 30 right through to the silica layer 32.

For this purpose, a wet isotropic etching, by means of fluorohydric acid or nitric acid, is used.

Instead of a wet isotropic etching, a plasma isotropic etching may be used.

Mask 34 is then selectively removed by using, for example hot phosphoric acid.

Sides 36 of the piezoresistive gauge 29 are on a gentle slope. Nearly all side tangents T make over 90° angles α with surface 37 of the silica layer 32, except close to the top of the piezoresistive gauge 29 where mask 34 was located.

Figure 5:
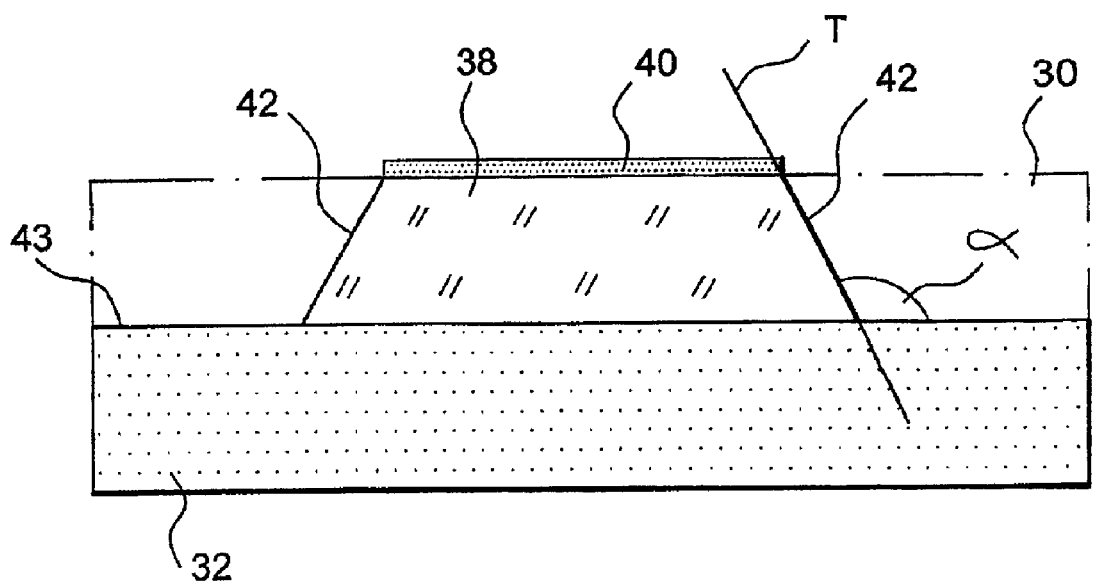
Figure 6:
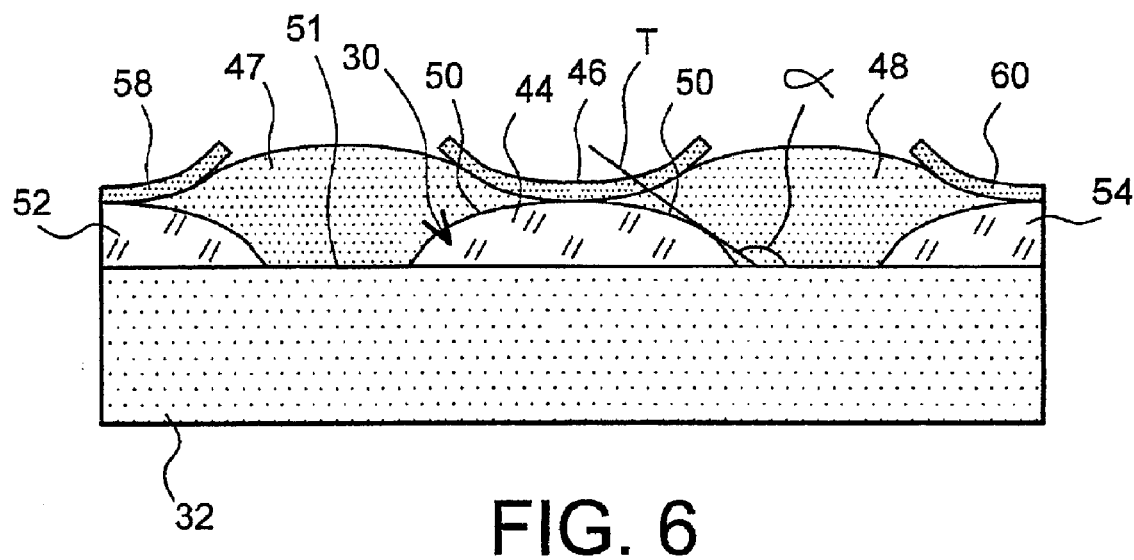
Figure 7:
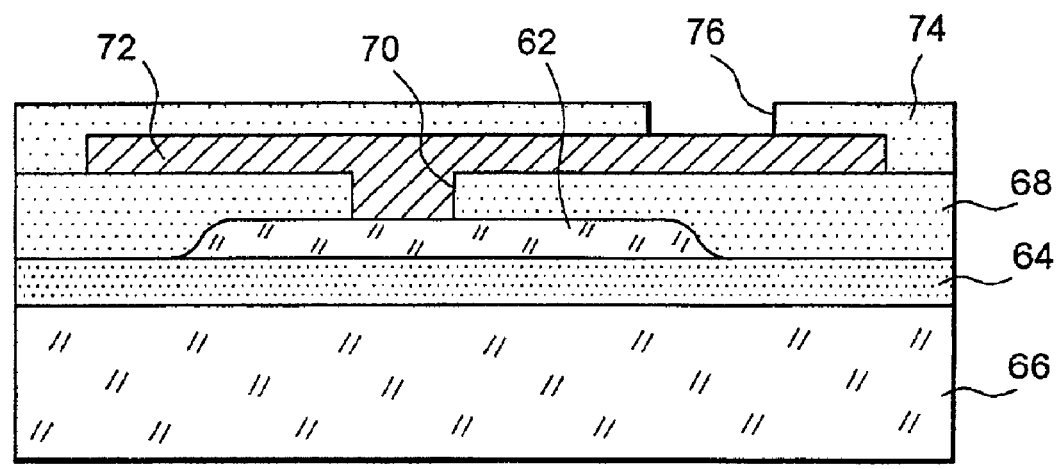
FIG. 7 is a cross-section diagram of a piezoresistive device in accordance with the invention that comprises an electric isolation layer of passivation.

In particular, we shall note the obtuse angles at places where these sides join surface 37 (this also being the case for piezoresistive gauges in FIGS. 5 to 7).

The technique described in FIG. 4 is simple.

The fact is that sides with a gentle slope lessen the risk of an uneven coating during subsequent deposit on the piezoresistive gauge 29.

Further, there is no more etching residue on sides 36 of this gauge 29.

FIG. 5 is a cross-section diagram of another piezoresistive device in accordance with the invention at manufacturing stage using a chemical anisotropic etching process.

This device comprises a piezoresistive gauge 38.

It is also manufactured using the structure referred to in the description of FIG. 4 that comprises silicon layer 30 on silica layer 32, itself formed on a substrate (not shown).

An etching mask 40, e.g in silicon nitride is initially deposited and structured on the silicon layer 30. A chemical anisotropic etching of the silicon layer 30 is then performed right through to the silica layer 32.

This is achieved by using for example potash or TMAH (abbreviation of tetramethylammonium hydroxide) or any other etching product that can perform an anisotropic etching on monocrystalline silicon.

The mask 40 is then selectively removed by using hot phosphoric acid.

The technique described in FIG. 5 is simple.

Sides 42 of the piezoresistive gauge 38 remain less than steep: tangents T of sides 42 make over 90° angles α with surface 43 of the silica layer 32.

Again, there is no etching residue on these sides 42.

Further, in the case outlined in FIG. 5, the sides of the piezoresistive gauge are limited by crystalline plans with a very weak surface roughness.

FIG. 6 is a cross-section of a diagram of another piezoresistive device in accordance with the invention at manufacturing stage by using an isolation growth process.

It is also manufactured using the structure referred to in the description of FIG. 4 that comprises a silicon layer 30 on the silica layer 32, itself formed on a silicon substrate (not shown).

This device comprises a piezoresistive gauge 44. The parts of other piezoresistive gauges shown in FIG. 6 correspond to a variant of the device, which shall be subsequently described.

An etching mask 46, e.g in silicon nitride, is initially deposited and structured on the silicon layer 30. In areas 47 and 48 of this layer 30, that are not protected by the mask 46, silica is then grown by silicon oxidation right through to the silica layer 32.

The mask 46 is then selectively removed, for example, by using hot phosphoric acid.

Sides 50 of the piezoresistive gauge 44 are still on a gently slope:tangents T of these sides form over 90° angles α a with surface 51 of the silica layer 32.

The transition, or interface, between the active material, namely the silicon of the piezoresistive gauge 44, and the isolation material, namely the silica in areas 47 and 48, is perfect in that it presents no discontinuity.

Further, the coating of sides 50 of the gauge 44 does not represent a problem since the silica in areas 47 and 48 is formed from the existing silicon.

The devices in accordance with the invention that have been described with reference to FIGS. 4 to 6, only have one piezoresistive gauge but could comprise a plurality of gauges of this type, each one spaced out along the layer of silica 32.

This is illustrated in a diagram in FIG. 6 where parts 52 and 54 of other piezoresistive gauges in silicon that are formed on the layer of silica 32 are shown either side of the piezoresistive gauge 44, and are separated from this gauge 44 by the silica areas 47 and 48.

It is understood that the mask 46 is adapted to the manufacture of all gauges. FIG. 6 also shows parts 58 and 60 of mask 46 that correspond to parts 52 and 54 of other gauges at manufacturing stage.

In the present invention, any other material instead of monocrystalline silicon may be used that allows the formation of piezoresistive gauges, such as polycrystalline silicon or silicon carbide, and for which a wet isotropic etching or a plasma isotropic etching is possible or from which an electric isolation material can be formed, for example, through a chemical reaction, where this electric isolation material is a nitride, an oxide or any other electric isolation compound.

FIG. 7 is a cross-section diagram of a piezoresistive gauge 62 in accordance with the invention.

This piezoresistive gauge 62, whose sides are a gentle slope, is formed using a process in accordance with the invention on a silica layer 64 itself formed on a silicon substrate 66.

Once this gauge 62 is manufactured, a passivating isolation layer 68 may be formed on it in silica for example. Thus, we obtain what may be called a buried piezoresistive gauge.

This passivating layer may be achieved either through deposit of isolation material (for example, silica or nitride) or through transformation (for example, by oxidation) of a surface layer of material of the gauge into an isolation material.

Through this layer 68 on the piezoresistive gauge 62, an opening 70 may then be formed allowing an electric contact with this gauge to be formed.

Subsequently, on the surface of the passivating layer 68 and in this opening 70, an electric conduction layer 72 in aluminium for example is deposited that is thus in contact with the silicon of the gauge. In a variant that is not shown, this electric conduction layer is a stacking of a titanium layer (in order to be in contact with the silicon), a layer of titanium nitride (in order to form a diffusion barrier) and a gold layer (in order to have a weak resistivity conductor available).

The electric conduction layer 72 is subsequently etched for definition.

If necessary, an electric isolation layer 74 may then be formed in silica for example on the thus defined conduction layer so as to protect the latter. Subsequently an opening 76 may then be formed through this layer 74 and above the conduction layer 72 to form a contact (not shown) with the latter, by using the wire bonding technique for example.

For information and by of example only, a piezoresistive gauge in accordance with the invention is of around 0.2 μm to a few micrometers in height, around 50 μm to 250 μm in length (counted parallel to the plane of figures) and a few micrometers in depth (counted perpendicular to the plane of figures).

The invention has various advantages, in particular:

an improved mechanical resistance of the piezoresistive gauges given the gentle slope of their sides, and a significantly improved reliability of the piezoresistive device in the case where the gauges are buried, or encapsulated, in an electric isolation material given that this encapsulation is comprehensive and with no discontinuity to the interfaces.

Further, the manufacturing process of which an example was provided in FIG. 6, leads to significant reliability given that it does not use etching and therefore, there is no risk of a re-deposition of material on the walls.

In addition, this manufacturing process leads to a perfect continuity between the electric isolation layer (silica in the FIG. 6 example) and the gauges, where there is an improved thermal resistance and a reduced risk of cracking.

What is claimed is:

1. A manufacturing process of a piezoresistive device comprising:
   forming at least one piezoresistive gauge on an electric isolation layer by,
      forming a layer of piezoresistive material on the electric isolation layer,
      layering a protection mask on the layer of piezoresistive material,
      modifying the piezoresistive material in areas not protected by the protection mask into an electric isolation material such that after selectively removing the mask, side walls of the thus formed piezoresistive gauge, when observed as a cross-section of the device, essentially form over 90° angles (α) with the surface of the electric isolation layer upon which the piezoresistive gauge is formed.

2. The process according to claim 1, wherein the piezoresistive material is selected from the group consisting of monocrystalline silicon, polycrystalline silicon and silicon carbide.

3. The process according to claim 1, wherein
   said protection mask is configured to prevent etching of areas of the piezoresistive material coated by said protection mask and,
   comprising:
   wet isotropic etching of areas of the piezoresistive material not protected by the protection mask, and
   removing said protection mask.

4. The process according to claim 1, wherein
   said protection mask is configured to prevent etching of areas of the piezoresistive material coated by said protection mask and, a comprising:

plasma isotropic etching of areas of the piezoresistive material not protected by the protection mask, and removing said protection mask.

5. The process according to claim 1, wherein said protection mask is configured to prevent etching of areas of the piezoresistive material coated by said protection mask, and comprising:

chemical anistropic etching of areas of piezoresistive material not protected by the protection mask and, removing said protection mask.

6. The process according to claim 1, wherein said protection mask is configured to prevent a transformation of areas of the piezoresistive material coated by said protective mask into a second electric isolation material, and comprising:

transforming the piezoresistive material within areas of the piezoresistive material not protected by the mask into said second electric isolation material, and removing said protection mask.

7. The process according to claim 6, wherein the second electric isolation material is the same as that of the electric isolation material.

8. The process according to claim 1, wherein the protection mask is made of a silicon nitride.

9. The process according to claim 1, comprising forming an electric isolation layer of passivation on the piezoresistive gauge.

10. The process according to claim 9, wherein forming the electric isolation layer of passivation is performed by transformation of the material of the piezoresistive gauge.

11. The process according to claim 9 comprising:

forming a contact opening through the layer of passivation on the piezoresistive gauge, forming an electric conduction layer on the layer of passivation and within the contact opening, and etching the electric conduction layer.

12. The process according to claim 11, comprising:

forming a further electric isolation layer on the electric conduction layer to protect the electric conduction layer, and forming an opening through the electric isolation layer.

13. The process according to claim 1, wherein the piezoresistive gauge walls are in contact with the isolation layer.

14. The process according to claim 1, wherein the piezoresistive gauge walls are curved and in contact with the isolation layer.

15. The process according to claim 14, wherein side tangents of the walls form obtuse angles with the isolation layer.

16. The process according to claim 1, wherein a surface area for said piezoresistive gauge at an intersection between said piezoresistive gauge and said electric isolation layer is larger than a surface area for said piezoresistive gauge at an intersection between said piezoresistive gauge and said protection mask.

* * * * *